United States Patent [19]

Fallon

[11] 3,904,832

[45] Sept. 9, 1975

[54] TRUNK CIRCUIT FOR CROSSBAR SWITCHING SYSTEMS

[75] Inventor: Joseph Rogers Fallon, Pickerington, Ohio

[73] Assignee: Western Electric Company, Incorporated, New York, N.Y.

[22] Filed: May 2, 1974

[21] Appl. No.: 466,490

[52] U.S. Cl. ............. 179/18 F; 179/22; 179/18 AH

[51] Int. Cl.² ........................................... H04Q 3/00

[58] Field of Search ................ 179/22, 18 F, 18 AH

[56] References Cited

UNITED STATES PATENTS

| | | | |
|---|---|---|---|
| 2,913,529 | 11/1959 | Jacobaeus et al. | 179/18 F |
| 3,253,088 | 5/1966 | Fisher et al. | 179/27 CA |
| 3,705,959 | 12/1972 | Swanson | 179/18 F |

*Primary Examiner*—William C. Cooper
*Attorney, Agent, or Firm*—H. R. Popper

[57] ABSTRACT

A marker-controlled crossbar switching system is disclosed having an intra-office trunk that does not require a thermal timing relay to prevent premature release of the linkage to the slower-to-hang-up-one of two parties interconnected by the trunk. Instead, the charging relay is reoperated when the first party disconnects and contacts of this relay release an auxiliary supervisory relay whose released contacts signal a "trunk idle" condition to the marker. The trunk is arranged so that if the marker reseizes the trunk for use on a new call before the second party has disconnected, the linkage to that party will be forcibly released.

11 Claims, 2 Drawing Figures

TRUNK CIRCUIT FOR CROSSBAR SWITCHING SYSTEMS

BACKGROUND OF THE INVENTION

This invention relates to crossbar switching systems and more particularly to an improvement in trunk circuits used in such systems.

Crossbar switching systems, as typified by the No. 5 crossbar manufactured by the Western Electric Company and disclosed inter alia in A. J. Busch U.S. Pat. No. 2,585,904 issued Feb. 19, 1952, are common control switching systems in which a marker translates call signaling information to determine an appropriate trunk route and which then selects an idle trunk in a trunk group serving that route. Thereafter the marker controls the establishment of a cross-office channel by selectively operating the crossbar switches of the line link and trunk link frames.

While the No. 5 crossbar system has been successfully employed in hundreds of telephone offices serving fairly densely populated segments of the country, less-populated areas have had to depend on the much older technology of step-by-step switching systems. Reduction in the cost of No. 5 crossbar to the point where it could be economically used to provide telephone switching services in more sparsely settled areas has been a much sought-after goal. It is believed that a reduction in the size and complexity of crossbar trunk circuits would be of appreciable importance in helping to make crossbar technology available to small central offices.

In the prior art No. 5 crossbar system, circuitry was provided to commence timing when one party to a conversation hung up. This timing circuitry prevented the immediate disconnection of the cross-office channel to the party who had not yet hung up so that the temporarily persisting off-hook condition would not initiate a wasteful dial tone initiation sequence. The timing interval most frequently employed was one of 13–32 seconds and was determined by the operation of a thermal timing relay. Such a relay is shown in FIG. 143 of Busch U.S. Pat. No. 2,585,904 and is designated as relay RL therein. This circuitry offered a service improvement over some of the older step-by-step systems that had no mechanism for releasing a connection if one party (usually the calling party) failed to hang up. At the time it was introduced therefore, the timed, forced disconnect of a called party (or of a calling party) was considered a step forward in the art of telephone switching since it gave better service to the telephone user and permitted more efficient use of the central office control equipment.

The 13–32 second interval was selected after some considerable observation of the manner in which people normally use the telephone. This interval, however, is somewhat larger than can be established with the use of conventional capacitor timing circuits without employing rather large, and therefore expensive, capacitors. The thermal timing relay has accordingly continued to be a very practical though bulky apparatus element for accomplishing this long interval timing function. It would, however, be desirable to eliminate the thermal relay and thereby achieve a smaller and more economical trunk circuit.

SUMMARY OF THE INVENTION

I have discovered that the thermal timing relay in the trunk can be eliminated thereby achieving an economy in trunk package size and cost without causing erroneous system operation. In accordance with my invention in one illustrative embodiment thereof, I employ a circuit that detects hang-up by one party to a connection and responds by immediately releasing the cross-office connection to that party. This detection circuit discriminates against a line hit from simulating hang-up by the re-use of a short interval timer, which advantageously may be the short interval timer already provided in the trunk circuit for distinguishing a line "hit" from legitimate called party answer. In addition to using the time out of this timer to disconnect the channel to the customer first hanging up I connect the timer to operate trunk circuit elements that will cause the trunk to display an "idle trunk" condition to the marker despite the fact that a cross-office connection continues to be maintained to the trunk by the party who has not yet hung up. The crossbar machine in which my trunk circuit is used will be employed in sparsely settled locations in which traffic conditions will usually be fairly light and the marker may normally be expected not to have need to immediately seize this trunk which has just been marked idle. Accordingly, a naturally occurring delay interval whose length is determined by the normal light traffic condition in the office served by the marker, will expire when the marker finds need to seize this idle appearing trunk for use on another call. When finally the marker does respond to the idle trunk condition to seize this trunk for use on a new call, it will operate an F relay in the trunk which F relay is quite similar to the trunk seizure F relay shown in the well-known Busch patent mentioned before. However, the F relay of my trunk has an additional work contact whose function it is to remove the sleeve lead holding ground from the cross-office channel remaining to the party who has persisted in remaining off-hook. Removal of the sleeve ground causes the channel to be taken down and initiates a sequence of marker operations that will route that party to a permanent signal trunk. The operation of the F relay will now allow the trunk to be re-used by the new call. Thus in accordance with my invention, I have used a naturally occurring system operation time to be used in place of the 13–32 second thermal timing relay time that was priorly required. It is believed that even under heavy traffic conditions when the marker might respond in less than 13 seconds to the idle signal that is generated by my trunk circuit that the disconnection of the persisting cross-office channel will cause no undesirable service effects since the re-use of the short interval timer has discriminated against the inadvertent recognition of a hit on the line of either party involved in an actual connection from being mistaken as a party disconnect signal.

DESCRIPTION OF THE DRAWING

The foregoing and other objects and features of my invention may become more apparent from the ensuing description when considered with the drawing in which.

DESCRIPTION OF THE DRAWING

Figure 1:
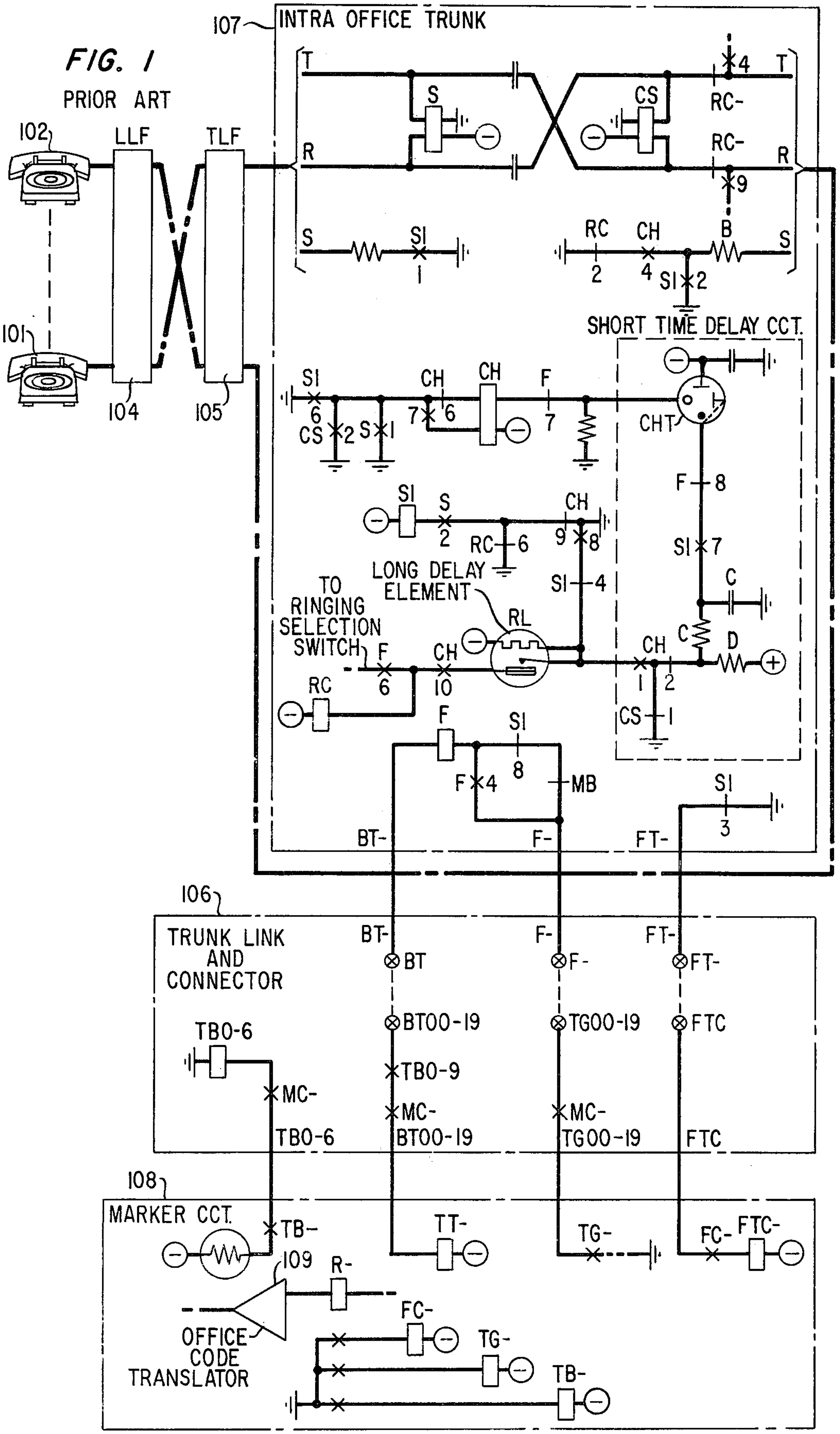
FIG. 1 shows a prior art crossbar switching system similar to that disclosed in Busch U.S. Pat. No. 2,585,904.

The advance provided by my present invention may be fully understood if the prior art No. 5 crossbar apparatus of FIG. 1 is first reviewed. In the prior art No. 5 crossbar system, telephones 101, 102 appear on frames of crossbar switches called line link frames, such as LLF 104, and may be connected to one another by means of trunk circuits, such as intra-office trunk 107 appearing on trunk link frames such as TLF 105. Typically, a trunk link frame may contain approximately 160 trunks of which 120 usually may be either outgoing trunks, intra-office trunks, or registers. The remaining 40 positions are usually allotted to incoming trunks.

The up-to-120 possible trunks of a trunk link frame are divided into 6 blocks of 20 trunks each and within each block from 1 to 20 groups may be equipped. In the trunk link there are 6 block relays each with 20 contacts. With this arrangement, the number of trunks per group may differ for each block; however, in any block a group includes only the trunks of one route and it will include all the trunks of that route, except when there are more than 20 trunks per route. In testing and seizing trunks, the marker designates one trunk block and one trunk group and this combination always identifies the trunks of one route.

In the course of setting up the call, an originating register (not shown, but also appearing on the trunk link frame) is employed to receive the dialed digits identifying the called telephone and the register then passes the called number to the marker. The marker office code translator 109 translates the office code portion of the called number to select either an intra-office trunk, if the called number pertains to a telephone in the same central office, or an outgoing trunk if the called line is not a local number. Ordinarily, a frame will have several trunks serving a given route (such as for intra-office calls) and normally, there will be more than one marker serving the group of trunk link frames.

When the marker translates the called number information, it operates a route relay R- corresponding to the office code data. The route relay operates an FC- relay. a trunk block relay and a trunk group relay. The FC- relay operates to connect the marker idle frame test relays, such as relay FTC-, to an FTC- terminal in trunk link 106 to which are cross-connected FT- leads from all trunks serving that route. Each of these trunks that is idle will apply a ground to its respective FT- lead to its respective FT- terminal in the trunk link. The FT- terminals of the group of trunks serving a given route are cross-connected to an FTC- terminal which represents all of the trunks of a single route on that frame. An FTC- relay operates in the marker for each trunk link frame having at least one idle trunk serving the route. Contacts of the FTC- relay are arranged in a preference chain (not shown) to allow the marker to select one of the trunk link frames by operating the MC- relay in the connector, such as connector 106, for that frame. For the purposes of simplifying the drawing, the preference chain and the winding of the MC- relay in trunk link connector 106 have been omitted. Details of such connections may be found in FIG. 141 of U.S. Pat. No. 2,585,904. Some of the more relevant ones of the contacts of the MC- relay that are associated with the TB-, BT-, and TG- leads which will be of interest in hereinafter highlighting the distinguishing characteristics of my invention have, however, been shown.

When a trunk block relay such as relay TB- is operated in the marker by the route relay R-, it operates a corresponding TBO- relay in trunk line 106 over a path completed by the aforementioned operation of the trunk link connector relay MC-. The operation of relay TBO- in trunk link 106 connects the BT- lead associated with one end of the windings of the F relays (in all of the trunks designated by the operated trunk block relay) to the winding of a marker TT- relay. The other end of the winding of the trunk F relay is connected to ground in the marker by the operation of the trunk group relay TG-, that was operated by the route relay R-. Accordingly, an operating path is provided which may be traced from ground in the marker over the contact of the operated trunk group relay TG- to lead TG, over trunk link frame connector contact MC- to the TG terminal in trunk link 106 which is cross-connected to the F terminals of the F relays of all trunks in that trunk group over the back contacts of the MB and S1 relays, the windings of the F relays and the BT leads in the idle trunks of the group back to respective BT- terminals in the trunk link 106. The BT- terminal of each trunk is cross-connected to a TB- terminal designating all the trunks in a given block and the path is continued over a make contact of the operated trunk block relay TB- and connector relay MC- to the winding of a trunk test relay TT- in the marker. Thus, when a frame is seized, a TT- relay for each idle trunk of the desired route will operate in the marker and the F relay will be operated in the trunk.

Two relays in each trunk circuit are involved in busy testing and seizing a trunk. An F relay is operated by the marker to seize the trunk and an S1 relay is operated and remains operated as long as the trunk is in use. As just explained, the F relay is operated over a path including a back contact of the trunk's S1 relay. If the trunk is in use, the circuit to the winding of that trunk's F relay will be opened by the contact of the S1 relay so that the trunk will not be seized by the marker.

The operating F relay in the intra-office trunk enables a level relay (not shown) in the trunk link frame to connect the called end (right-hand) appearance of the trunk 107 to the marker. The marker now determines the location of the called line via the number group circuit (not shown) which has decoded the rest of the called number digits to obtain the called line's equipment location. Eventually, assuming the called telephone 102 to be idle, a cross-office connection is made as described in U.S. Pat. No. 2,585,904 (at column 80, et seq.) between the called appearance of the intra-office trunk and the line link frame appearance of called telephone 102. Also, as described in the above-mentioned patent at column 89, et seq., the marker determines the proper ringing combination for the called telephone, and through a ringing selection switch (not shown), sets the proper ringing code and operates trunk relay RC over a path made available by make contact 6 of relay F. The marker then goes about setting up the callback connection from the calling (left-hand) appearance of the intra-office trunk to the calling telephone 101 appearance on line link frame 104. Trunk supervisory relay S is operated by the calling station loop when the call-back linkage is completed. The marker also performs other operations described in the above-mentioned patent at column 99 et seq. and then releases from the trunk causing ringing to be applied to the called telephone 102.

When the called subscriber at telephone 102 answers ringing, a low resistance circuit is closed through the called telephone switchhook contacts to the winding of a ringing trip relay (not shown) in trunk 107 which operates to remove ringing and to release relay RC at whose transfer contacts 4, 9, continuity is established between the calling and called end truck appearances. Trunk supervisory relay CS now operates over the called station loop.

Capacitor C is normally connected through resistances C and D to positive potential, typically 130 volts, but is prevented from charging prior to the time relay CS operates by the ground connected over back contact 1 of relay CS and the back contact 2 of relay CH which shunt down the resistance battery. When relay F releases, condensor C is connected over contact 7 of relay S1 and back contact 8 of relay F to the control gap of gas tube CHT. When relay CS operates over the called subscriber's line, the shunting ground is removed and condensor C starts to charge. After from 2 to 5 seconds the voltage across the condensor reaches the value that will cause tube CHT to break down its control gap, the main gap then conducts and a circuit is completed from ground over contact 6 of relay S1, contact 6 and the upper winding of relay CH, contact 7 of relay F across main gap of tube CHT to positive battery. Relay CH operates in this circuit and locks over its lower winding to contact 6 of relay S1. Conduction in tube CHT is then interrupted by the back contact of transfer contact 6 of relay CH.

If the called party now disconnects, the release of switchhook contacts of telephone 102 open the supervisory loop and relay CS releases. Relay CH, however, is held operated under the control of contact 1 of relay S for supervising the calling line's loop. Relay CS released, at its contact 1 and contact 1 of relay CH, closes a circuit to the heater element of thermal relay RL. At the end of approximately 13 seconds relay RL operates closing its contact to complete a circuit from battery through the winding of relay RC. contact 10 of relay CH to ground over contact 1 of relay CH. Relay RC reoperates in the circuit (it had priorly been operated incident to the marker's setting of the ringing combination and subsequently released). Although relay RC reoperates, it neither locks nor applies ringing since the ringing switch had been released when the called party answered the call. Relay RC operated at its contact 6, releases relay S1 which disconnects ground at its contacts 1 and 2 from the sleeve lead of the calling and called line appearance of the intra-office trunk and at its released back contacts 8 reconnects the winding of relay F between leads BT- and F-. Removal of ground from the sleeve conductor causes the hold magnet in trunk line frame 105 connecting the calling appearance of the intra-office trunk to the cross-office channel to be released. Supervisory relay S now releases releasing relay CH. The prior art timed release feature thus described which prevents the calling party from holding the called line out of service indefinitely is also disclosed in L. T. Anderson U.S. Pat. No. 2,509,050.

DETAILED DESCRIPTION OF THE INVENTION

Figure 2:
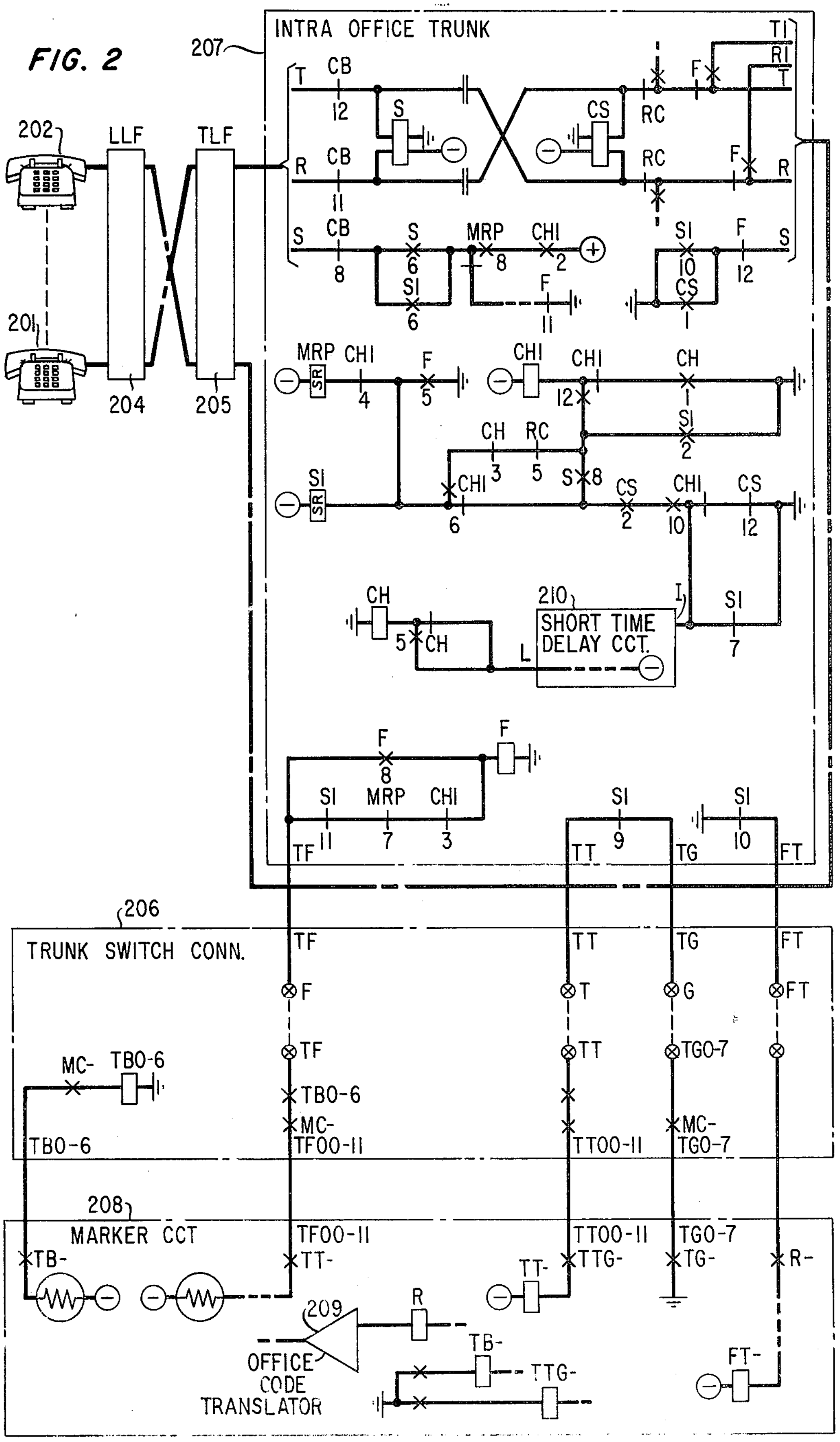
FIG. 2 shows a crossbar switching system employing the trunk circuitry of my invention.

Referring now to FIG. 2, there is shown the calling and called telephone sets 201, 202, the line and trunk link frames 204, 205, the trunk switch connector 206, and relevant portions of the intra-office trunk 207 and marker circuitry 208 arranged according to an embodiment of my invention. It will be noted that in FIG. 2 there are 7 trunk blocks and 8 trunk groups instead of 6 trunk blocks and 20 trunk groups of the No. 5 crossbar system.

The marker called-number translator 209 operates a route relay R- upon translating the office code portion of the called director number in substantially the same manner as the prior art marker just described. Contacts of the operated route relay R-: (1) directly connect a marker FT- relay (formerly an FTC relay) to a cross-connection terminal to which the FT leads of all trunks serving the indicated route are wired; (2) operate a marker trunk block relay TB- and (3) a trunk group relay TTG-. There is one FT- lead per trunk switch connector 206 per route associated with intra-office trunks. If there is at least one idle intra-office trunk, ground will be applied to operate an FT-relay in the marker for each frame having such an idle trunk. The operated FT- relay through contacts (not shown) selects one of the trunk switch circuits such as circuit 206 by operating its connector relay MC- (winding not shown). The operation of trunk switch connector relay MC- connects the TF, TT, and TG leads to the markers and completes a path for the operated trunk block relay in the marker to operate a corresponding trunk block relay TBO-6 in trunk switch connector circuit 206.

Assuming that trunk 207 is idle, the operation of relay TTG- applies ground to lead TG which is continued over TGO-7 to G terminal jumper in connector 206 and the 9 back contact of trunk relay S1 to terminal T in the trunk switch connector. The continuity of lead TT is there extended by a T- to TTOO-11 terminal jumper and a make contact of the trunk block TB- and group TTG- relays to operate a trunk test relay TT- in the marker. The operated TT- relay prepares a path for extending resistance battery back to the trunk or lead TF to operate the trunk's F relay so that the marker may seize the trunk.

Comparing the thus-far described operations of FIGS. 1 and 2, it is seen that in the prior art No. 5 crossbar system, the trunk test relay TT- in the marker was operated over a path that included the serially connected winding of the F relay of an idle trunk whereas in my present invention in FIG. 2 the trunk test relay in the marker is operated over a path not involving the winding of the F relay.

The F relay operated locks itself over its number 8 contact to lead TF. Transfer contact of the F relay associated with the tip and ring leads T,R transfer the continuity of the called end appearance of the trunk circuit 207 to the trunk switch and connector circuit 206 and via that circuit to marker 208 over path (not shown) by means of which the marker performs the customary continuity test of the cross-office channel to the called telephone 202. The operation of relay F through others of its work contacts, also not shown, cuts through to the marker operate paths for various other trunk relays by means of which conditions are established for setting up of a ringing code and for establishing the call-back linkage to the calling telephone 201. These circuit paths for the purpose of simplifying the drawing have, however, not been shown. In addition, relay F at its make contact 5 operates relays MRP and S1. Contact 8 of relay MRP prepares a path for the application of positive battery (message register scoring potential) to the sleeve lead of the calling appearance of the trunk.

The path will be completed when relay CH1 is operated as hereinafter explained.

At its back contact 11, relay F removes ground from the sleeve of the calling end appearance of trunk 207. (The significance of this will presently be explained.) Relay S1 operated at its make contacts 2 partially closes locking paths for itself and for relays CH1 and MRP. At its contacts 6 and 10, respectively, relay S1 partially closes ground through to the sleeve leads of the calling and called end appearances of the trunk.

Thereafter the marker performs operations similar to that described above for the prior art intra-office trunk circuit including the storing of ringing code information in the trunk, the setting-up and checking of the channel to the calling telephone and preparatory to releasing itself from the trunk releases the trunk relay F. The release of the trunk relay F causes the release, over a path not shown, of the operating winding of relay CB whose back contacts 11 and 12 now connect calling loop supervisory relay S to the tip and ring of the calling appearance of trunk 207. With the release of relay F by the marker, its reoperation is prevented by contact 11 of relay S1. Contacts 9 and 10 of relay S1 interrupt the continuity of leads TT, TG, and FT, respectively, causing the trunk to appear busy to the marker. The marker then disconnects from the trunk and ringing is applied over the make contacts of transfer contacts RC to the called telephone. The operating path to the winding of relay RC is not shown since it is not essential to the understanding of the invention.

If the calling customer hangs up the telephone set 201 during ringing (which commences when the marker releases) relay S will release in turn releasing slow release relays MRP and S1. Relay S1 released, at its contacts 9 and 10, restores continuity to leads TT, TG, and FT. Restoration of the continuity of these leads makes the intra-office trunk appear idle to the marker. Upon release of relays S1 and MRP, continuity is restored to the winding of relay F so that the trunk may be seized for use on another call. Accordingly, it is seen that intra-office trunk 207 maintains supervision under control of the calling party during ringing so that if a call is abandoned by the calling telephone, the trunk may be re-used by the marker for another call.

When the called subscriber answers ringing at telephone 202, a ringing trip relay (not shown) operates removing ringing by releasing relay RC. The restored back contacts of the RC relay transfer contacts connect called supervisory relay CS to the tip and ring leads of the called customer loop of telephone 202 and relay CS and operates over the loop. Relay S, connected to supervise the loop toward the calling telephone 201, remains operated so long as the calling customer does not abandon the call. with relay S operated, a locking path is provided over its contact 8, break contact 6 of relay CH1 and contact 2 of relay S1. Contact 6 of relay S also closes another path to maintain ground on the sleeve lead towards the calling telephone. The operation of relay CS at its contact 12 removes ground from terminal I of the short interval time delay circuit 210 of intra-office trunk 207. The details of time delay circuit 210 are not shown inasmuch as any well-known short interval circuit having a capacitor discharge timing interval of 685 to 800 milliseconds may be employed to control a relay internal to circuit 210 that will apply battery to the winding of relay CH after the aforementioned time out interval. Relay CH is thus operated after approximately 685 to 800 milliseconds. Relay CH operated operates relay CH1 which locks operated over contact 2 of relay S1. Relay CH1 also transfers the I lead of the time delay circuit 210 to ground over a path included contact 10 of relay CH1, contact 2 of relay CS, contact 8 of relay S and contact 2 of relay S1. The re-grounding of the I terminal of short delay timing circuit 210 causes circuit 210 to remove battery from the winding of CH causing relay CH to release. The operation of relay CH1 at its contact 6 transfers the holding path for relay S1 to a path which is under the control of back contact 3 of relay CH. At its make contact 2, relay CH1 also applies positive message register scoring potential to the sleeve lead of the calling appearance of the trunk to operate the message register in the event that the calling station is associated witha message register line. At its back contact 4, relay CH1 opens the operating path for relay MRP which releases. The relay MRP is a slow release relay to ensure that the release of its contact 8 does not prematurely remove the message register potential from the sleeve lead. After relay MRP releases, the back contact of its transfer contact 8 restores holding ground to the sleeve of the calling appearance of trunk 207.

Should the called telephone now be placed in the on-hook state, the open loop will cause called end supervisory relay CS to release. The release of relay CS at its released make contact 1 partially removes ground from the sleeve lead of the called appearance of trunk 207. At its released make contact 2, relay CS removes the ground normally maintained on the I lead of short time delay circuit 210. The delay circuit 210, accordingly, commences to discharge its internal capacitor (not shown) and, after an interval of approximately 685 to 800 milliseconds, completes a battery operating path to reoperate relay CH.

The reoperation of relay CH at its back contact 3 opens the locking path for slow release relay S1. Relay S1 releases and at its released make contact 10 removes ground from the sleeve lead of the called appearance of trunk 207 releasing the channel to called telephone 202. The short delay interval provided by timer 210 prevents premature release of the channel in the event that relay CS had only temporarily released due to a "hit" on the line. (Thus, if relay CS is restored before timer 210 times out, the ensuing operations do not take place). Relay S1 released at its make contact 2 releases relay CH1 and at its back contacts 9 and 10, respectively, restores continuity between leads TT and TG and reapplies ground to lead FT. The restoration of the continuity between leads TT and TG and restoration of the ground to lead FT makes trunk 207 appear idle to marker 208 and renders trunk 207 available to be reseized on a new call.

As mentioned above, the time interval elapsing between the release of trunk relay S1 and the seizure of the trunk by the marker on a new call will depend on the number of intra-office trunks in the particular telephone office and on the traffic presented to the office. This interval will normally be expected to be somewhat longer than the time it would take for the calling telephone user to restore his telephone 201 to the on-hook condition. When the calling customer does restore telephone 201 to the on-hook condition, calling end supervisory relay S releases and at its released make contact 6 removes from the sleeve the holding ground made available over back contact 11 of the F relay.

If, however, calling telephone 201 remains in the off-hook condition when the marker reseizes trunk 207 for use on the new call, the cross-office channel to telephone 201 will then be released in the following manner: The marker, upon finding trunk 207 to be idle, applies resistance battery to lead TF operating trunk relay F over the path including back contact 11 of relay S1, back contact 7 of relay MRP, and back contact 3 of relay CH1. Relay F operates and locks over its number 8 contact to lead TF. Relay F operated at its back contact 11 removes holding ground from the sleeve of the calling appearance of trunk 207 thereby releasing the channel to telephone 201. With the release of the channel to telephone 201, the new call may be processed in the same fashion as if trunk 207 were being seized for the first time.

If the calling customer had disconnected while the called customer remained off hook, the operations would be similar to that just described except that relay S would release when the calling customer hung up while relay CS would remain operated. The release of relay S at its released make contact 6 partially removes ground from the calling appearance of trunk 207 and at its released make contact 8 removes ground from the I terminal of timer 210 starting the 685 to 800 millisecond timing interval at the end of which time timer 210 reoperates relay CH. The operation of relay CH at its back contact 3 removes the holding ground for relay S1 which releases. The release of relay S1 at its released make contact 6 removes the holding ground from the sleeve of the calling appearance of trunk 207 releasing the channel to the calling telephone. The released contacts 9 and 10 of relay S1 make trunk 207 appear idle to the marker and, should the trunk now be reseized by the marker for use on a new call, the reoperation of relay F at its back contact 5 will remove ground from the sleeve of the called appearance of trunk 207 despite the fact that relay CS has not been released. The removal of ground from the called appearance of trunk 207 releases the channel to telephone 202. Thereafter trunk 207 will be employed by the marker on the new call in the same manner as if the trunk had not priorly been used.

Accordingly, I have shown an improved crossbar switching arrangement in which an intra-office trunk prevents premature reinitiation of a service request by a customer who allows his telephone to remain off-hook after the other telephone customer has hung up but which does so without requiring the use of a long interval delay timer. Further and other modifications will become apparent to those of skill in the art without departing from the spirit and scope of the invention.

What is claimed is:

1. A crossbar trunk circuit for a switching system employing a common switch controlling marker comprising calling and called party loop supervisory means for supervising the state of respective loop circuits connected to said trunk circuit, first means controlled by the one of said calling and called party loop supervisory means first detecting the on-hook state of a supervised loop for disconnecting said on-hook supervised loop from said trunk circuit, second means controlled by said first detecting one of said supervisory means for causing said trunk circuit to indicate an idle condition to said common switch controlling marker, and means in said trunk circuit operative upon the subsequent seizure of said trunk circuit by said common switch controlling marker for disconnecting the other supervised loop associated with said loop supervisory means which has not yet detected an on-hook condition.

2. A crossbar trunk circuit according to claim 1 further comprising short interval delay means responsive to said loop supervisory means detecting the on-hook state for delaying the operation of said second means until the on-hook condition has persisted for a predetermined interval.

3. A crossbar trunk circuit according to claim 2 wherein said first means controlled by said first detecting one of said supervisory means includes means for partially releasing the loop circuit associated with said loop supervisory means which has not yet detected said on-hook condition.

4. A crossbar trunk circuit for connecting calling and called party loop circuits in a switching system employing a common switch controlling marker comprising means responsive to an on-hook signal indication by either said calling or called party loop circuit during a call for releasing said on-hook indicating loop circuit from said trunk and for initiating the release of the other said loop circuit which has not yet indicated on-hook supervision, and means controlled by a subsequent seizure of said trunk circuit by said marker on another call for completing the release of said other of said loop circuits.

5. In a telephone switching system having trunks for interconnecting calling and called party loop circuits and in which a common switch controlling marker responds to an off-hook condition of a loop circuit as a service requesting indication, the improvement comprising means for preventing said marker from prematurely responding as for a service request to an off-hook condition of a loop circuit persisting after a connection had been established through said trunk circuit to another loop circuit when said other loop circuit has returned to the on-hook condition said means including means for retaining said connection of said trunk to said loop circuit persisting in said off-hook condition until said marker requires the use of said trunk circuit on another call, and means responsive to the reseizure of said trunk circuit on said another call for disconnecting said persisting loop circuit from said trunk circuit.

6. In a telephone switching system according to claim 5, the combination wherein said preventing means includes means responsive to the first of said loop circuits indicating an on-hook condition for releasing the connection of said trunk to said on-hook indicating loop circuit.

7. In a telephone switching system according to claim 6, the combination wherein said preventing means includes further means responsive to the first of said loop circuits indicating said on-hook condition for delivering an idle trunk indication to said common switch controlling marker.

8. In a marker-controlled crossbar switching system having a plurality of trunks for interconnecting line circuits in which the marker may re-access a given trunk in a group of trunks after an indeterminate interval of time determined by the traffic destined for said trunk group, an arrangement for employing said time interval to prevent the line circuit of a party who is slower in returning his telephone set to the on-hook condition following hang up by the other party from prematurely indicating a request for service, comprising trunk circuit means operative in a trunk interconnecting a calling and called line circuit for responding to the on-hook state from either of said line circuits when the other thereof is in the off-hook state to cause said trunk to indicate an idle trunk condition to said marker, means in said trunk for maintaining said line circuit which persists in said off-hook state connected to said trunk and means responsive to the reseizure of said trunk by said marker after said time interval for disconnecting said last-mentioned line circuit.

9. In a switching system having a plurality of trunk circuits each of which is enabled to be connected between two loop circuits, means for disconnecting from a trunk circuit the first of said loop circuits which indicates an on-hook state, means for preventing the disconnection of the other of said loop circuits from the trunk circuit until said other of said loop circuits exhibits the on-hook state, and means for overriding said preventing means when said trunk circuit is seized for use on another call.

10. A switching system according to claim 9 wherein said system includes a common switch controlling marker, first trunk circuit means for indicating an idle trunk condition to said marker operative upon the first of said loop circuits to indicate an on-hook state, and wherein said overriding means includes second trunk circuit means for releasing the one of said loop circuits still indicating an off-hook state when said marker reseizes said trunk circuit on another call responsive to said idle trunk indication.

11. In a crossbar marker controlled switching system having a plurality of trunks including an intra-office trunk for interconnecting calling and called telephone loop circuits, said trunk including calling and called party loop supervisory relays for supervising the state of and providing primary holding paths for the respective loop circuits connected to said trunk circuit, charging relay means normally operable temporarily to apply message register scoring potential to the sleeve lead of the calling appearance of said trunk circuit, short time interval delay means normally responsive to the operation of said called party loop supervisory relay for delaying the operation of said charging relay until said called loop has indicated an off-hook state for an interval sufficiently long to discriminate against false answer, and auxiliary relay means operable upon the seizure of said trunk by said marker and locked upon the release of said charging relay means for providing additional holding paths for said calling and called loop circuits and for signaling a trunk busy condition to said marker the improvement comprising a first circuit path controlled by the first one of said calling and called party loop supervisory relays first detecting the on-hook state of a supervised loop for reoperating said short time interval delay means, a second circuit path controlled by the reoperation of said charging relay by said reoperating of said time interval delay means for releasing said auxiliary relay means, and third circuit means operative upon the subsequent seizure of said trunk by said marker in response to the idle condition signaled by said auxiliary relay means in the released condition for disconnecting the other supervised loop associated with said loop supervisory means which has not yet detected an on-hook condition.

* * * * *

UNITED STATES PATENT AND TRADEMARK OFFICE

CERTIFICATE OF CORRECTION

PATENT NO. : 3,904,832

DATED : September 9, 1975

INVENTOR(S) : Joseph R. Fallon

It is certified that error appears in the above-identified patent and that said Letters Patent are hereby corrected as shown below:

Column 4, line 3 change "line 106" to --link 106--.

Column 5, line 54 change "line frame" to --link frame--.

Column 6, line 37 change "or" to --on--.

Column 7, line 55 after "call." change "with" to --With--.

Signed and Sealed this

*second* Day of *March 1976*

[SEAL]

*Attest:*

RUTH C. MASON
*Attesting Officer*

C. MARSHALL DANN
*Commissioner of Patents and Trademarks*